April 8, 1952              G. E. DATH              2,591,922

FRICTION SHOCK ABSORBER FOR RAILWAY CAR TRUCKS

Filed Dec. 30, 1948              2 SHEETS—SHEET 1

Inventor:
George E. Dath.
By Henry Fuchs.
Atty.

April 8, 1952  G. E. DATH  2,591,922

FRICTION SHOCK ABSORBER FOR RAILWAY CAR TRUCKS

Filed Dec. 30, 1948  2 SHEETS—SHEET 2

Inventor:
George E. Dath.
By Henry Fuchs
Atty.

Patented Apr. 8, 1952

2,591,922

UNITED STATES PATENT OFFICE 2,591,922

FRICTION SHOCK ABSORBER FOR RAILWAY CAR TRUCKS

George E. Dath, Mokena, Ill., assignor to W. H. Miner, Inc., Chicago, Ill., a corporation of Delaware Application December 30, 1948, Serial No. 68,200

15 Claims. (Cl. 267—9)

1

This invention relates to improvements in friction shock absorbers, especially adapted for use in connection with truck springs of railway cars for snubbing the action of the springs.

One object of the invention is to provide an efficient shock absorber of simple design, comprising a friction post, a second friction post, said posts having sliding frictional engagement with each other, a friction shoe having sliding engagement with said first named post, means for pressing the shoe against said first named post and pressing the posts against each other, including a rubber pad under compression reacting between said shoe and an abutment fixed with respect to the second named post, and spring means yieldingly opposing relative movement of the posts toward each other.

A further object of the invention is to provide a friction shock absorber comprising a pair of relatively lengthwise slidable friction posts, friction shoes having sliding engagement with the posts, resilient means for forcing said shoes and posts into tight frictional contact with each other, and spring means yieldingly opposing relative movement of the posts and shoes with respect to each other.

Other objects of the invention will more clearly appear from the description and claims hereinafter following.

Figure 1:
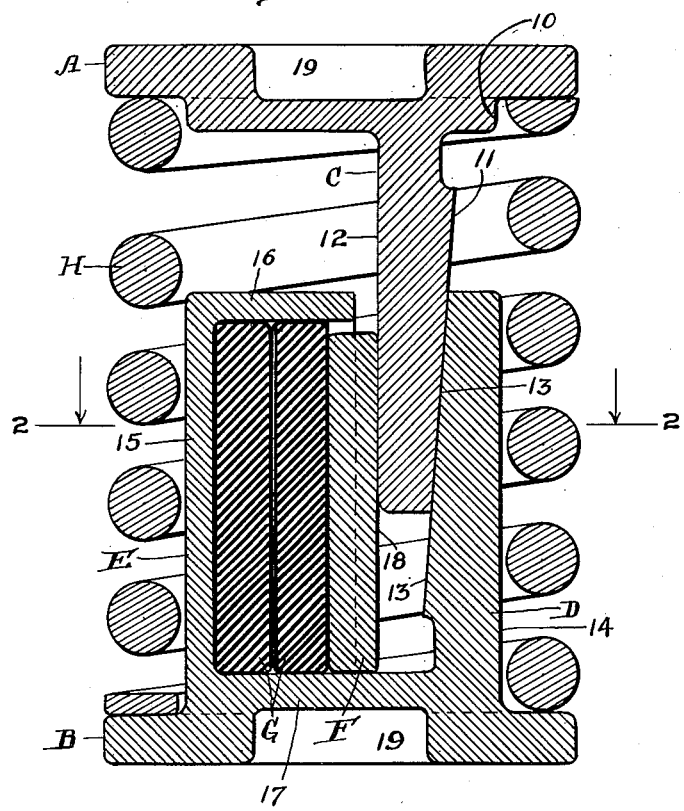
Figure 2:
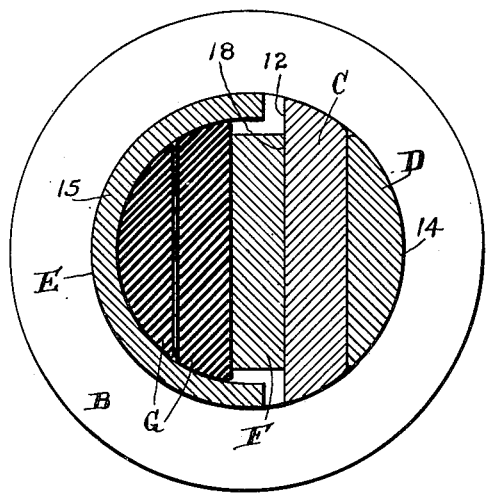
Figure 3:
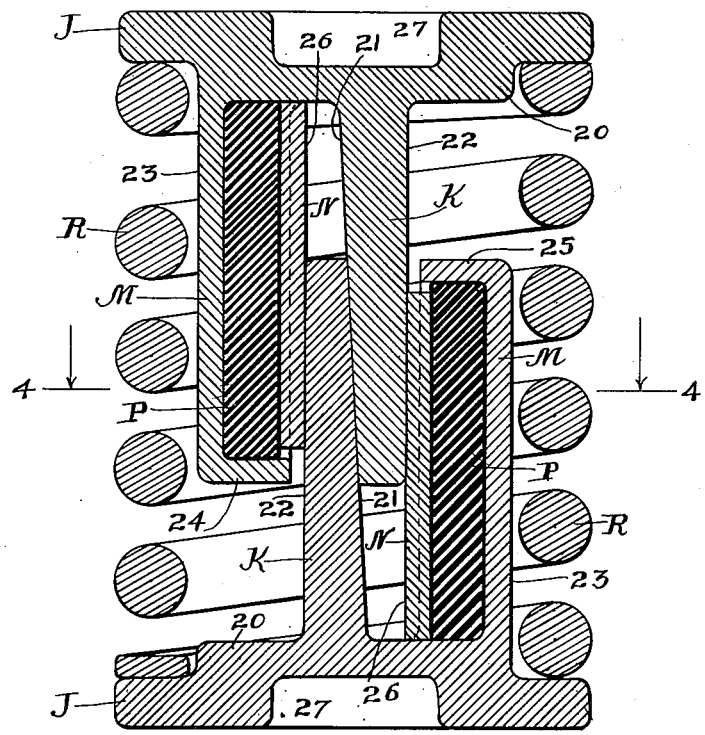
Figure 4:
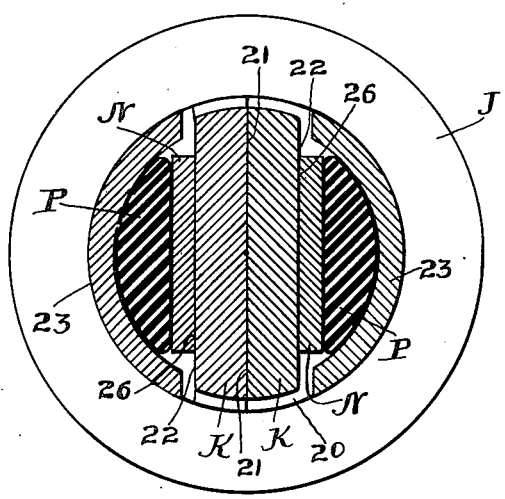

In the accompanying drawings forming a part of this specification, Figure 1 illustrates one embodiment of the invention, said figure showing a transverse vertical sectional view of the improved shock absorber. Figure 2 is a horizontal sectional view, corresponding substantially to the line 2—2 of Figure 1, with the outer spring omitted. Figure 3 is a view similar to Figure 1, illustrating another embodiment of the invention. Figure 4 is a horizontal sectional view, corresponding substantially to the line 4—4 of Figure 3, with the outer spring omitted.

Referring first to the embodiment of the invention illustrated in Figures 1 and 2, my improved shock absorber comprises broadly a pair of relatively movable top and bottom followers A and B, a top friction post C depending from the top follower, a bottom friction post D upstanding from the bottom follower, a housing E upstanding from said bottom follower, a friction shoe F within the housing and having sliding engagement with the post C, a rubber element G within the housing for pressing the shoe F against the post C, and a helical coil spring H yieldingly resisting relative movement of the followers A and B toward each other.

2

The top follower A is in the form of a circular disclike plate, having the post C depending therefrom and formed integral therewith, the post being disposed to one side of the central vertical axis of the device, that is, to the right of said axis, as shown in Figure 1. At its lower side, the follower A is provided with a cylindrical boss 10 of smaller diameter than the follower, in the form of a base for the post. On its outer side, the post C presents a lengthwise extending, flat friction surface 11, which is inclined upwardly and outwardly with respect to the vertical. On its inner side, the post C presents a vertically extending, flat friction surface 12.

The bottom follower B is also in the form of a circular disclike plate having the post D upstanding therefrom and formed integral therewith. The post D is at the same side of the central vertical axis of the device as the post C, but is located outwardly of the latter, and has a lengthwise extending flat friction surface 13 on its inner side correspondingly inclined to the surface 11 of the post C and engaged therewith. The outer side of the post D is transversely rounded, as indicated at 14. At the side of the follower B, opposite to the post D, is located the housing E, which upstands from said follower and is formed integral therewith. The housing E is defined by a curved vertical side wall 15, a horizontal top wall 16, and a bottom wall 17, which bottom wall is defined by part of the follower B. The housing is thus open at its inner side, that is, at the side thereof facing the post D.

The friction shoe F is in the form of a vertically disposed, flat, rectangular plate arranged within the open side of the housing E and presents a flat outer friction surface 18 engaging the flat friction surface 12 of the post C.

The rubber element G is contained within the housing E between the shoe F and the wall 15 of the housing. The element G is under initial compression and presses the shoe F against the post C. As shown, the element G is vertically divided, comprising a pair of rubber blocks fitting the interior of the housing.

The spring H is in the form of a helical coil surrounding the housing E and the posts C and D and bearing at its top and bottom ends on the followers A and B.

The improved shock absorber preferably replaces one of the spring units of a truck spring cluster, however, several of the improved shock absorbers may be employed in a single cluster of springs, replacing two or more units of the same. The improved shock absorber is interposed directly between the top and bottom spring follower plates of the cluster of truck springs, and the top and bottom followers A and B are recessed, as indicated at 19—19, to provide seats for the usual centering projections of the spring follower plates of the truck spring cluster.

The operation of my improved shock absorber illustrated in Figures 1 and 2 is as follows: Upon the spring cluster of the truck of a railway car being compressed between the follower plates of said cluster, the improved shock absorber is compressed therewith between said follower plates, forcing the follower A and the post C downwardly with respect to the post D and the friction shoe F against the resistance of the spring H, thereby effecting sliding movement between the friction post C and the post D and also between the post C and the shoe F, the shoe F being forced into frictional engagement with the post C by the rubber element G, and the post C, in turn, being forced into frictional engagement with the post D. Due to the taper of the posts C and D, the parts of the device are expanded laterally during lengthwise compression of the same, thereby additionally compressing the rubber element G with resultant increasing frictional resistance between the shoe F, post C, and between the posts C and D during compression of the device.

As the spring follower plates of the truck springs are separated, due to recoil of said springs, the followers A and B are moved apart lengthwise by the expansive action of the spring H, thereby restoring the parts to the normal full release position shown in Figure 1.

Referring next to the embodiment of the invention illustrated in Figures 3 and 4, the construction is similar to that shown in Figures 1 and 2, with the exception that a second friction plate is added, which has sliding engagement with the lower friction post.

The embodiment of the invention illustrated in Figures 3 and 4 comprises broadly top and bottom followers J—J, top and bottom friction posts K—K, extending from the followers, top and bottom housings M—M formed on the followers J—J, top and bottom friction shoes N—N cooperating with the posts, rubber elements P—P for pressing the shoes against the posts, and an outer spring R surrounding the posts and housings and yieldingly opposing relative movement of the followers J—J toward each other.

The top and bottom followers J—J are of the same design, each being in the form of a heavy metal disc. The top and bottom friction posts K—K, which project from the top and bottom followers, are also identical, each post being formed integral with the corresponding follower, the top post K depending from the top follower J and the bottom post K upstanding from the bottom follower J. Each follower J has a cylindrical boss 20 on the inner side thereof of smaller diameter than the follower in the form of a base for the post.

The posts K—K have engaging flat friction surfaces 21—21 on their inner sides, which are inclined with respect to the central longitudinal axis of the mechanism. On the outer side, each post K presents a flat, vertically extending friction surface 22, which is engaged with the corresponding shoe N. The posts K—K thus are of tapered formation.

The top and bottom housings M—M are formed integral with the followers J—J of the top and bottom posts. Each housing M is laterally spaced from the inner side of the post K, which projects from the corresponding follower J and is defined by a vertically extending, transversely curved side wall 23 and transversely extending top and bottom walls, the bottom wall of the top housing M being indicated by 24 and the top wall of the same being formed by the top follower J, and the top wall of the bottom housing M being indicated by 25 and the bottom wall of the same being formed by the bottom follower J. The housings M—M are thus open at their inner sides, the open sides of the same facing the posts K—K.

Each friction shoe N is in the form of a rectangular plate having a flat friction surface 26 on its outer side. The shoes N—N are arranged within the respective housings M—M and have the friction surfaces 26—26 engaging the friction surfaces 22—22 at the outer sides of the posts K—K, the top shoe N engaging the friction surface 22 of the bottom post K and the bottom shoe N engaging the friction surfaces 22 of the top post K.

The rubber elements P—P are in the form of blocks disposed within the housings M—M, each block fitting the corresponding housing and being interposed between the corresponding shoe N and the side wall 23 of said housing. These rubber blocks are under initial compression and press the shoes N—N against the posts K—K and the posts K—K against each other.

The spring R is in the form of a helical coil surrounding the posts and housings. This spring bears at its top and bottom ends on the top and bottom followers and yieldingly opposes relative movement of the followers toward each other. Each follower J is also provided with an outwardly opening central seat 27 adapted to receive the usual spring centering projection of the corresponding spring follower plate of the truck spring cluster.

The operation of the device shown in Figures 3 and 4 is substantially the same as that of the device shown in Figures 1 and 2, with the exception that friction is also provided between the bottom post K and the additional top friction shoe N.

I claim:

1. In a friction shock absorber, the combination with a friction post; of follower means at the outer end of the post; an abutment on said follower means fixed with respect to the post and spaced laterally therefrom; a second friction post; follower means at the outer end of said second post, said posts being movable lengthwise toward and away from each other; an abutment on said second named follower means fixed with respect to said second named post and spaced laterally therefrom; a friction shoe abutting each follower means and movable with the corresponding post, each post having sliding engagement between the other post and the associated shoe; yielding means interposed between and bearing on each shoe and the abutment associated with the corresponding post for pressing said shoe against the other post; and spring means bearing on said first and second named follower means for yieldingly resisting relative approach of said posts.

2. In a friction shock absorber, the combination with top and bottom followers; of a top friction post depending from said top follower; a bottom friction post upstanding from said bottom follower; a depending housing on said top follower laterally spaced from the inner side of said top post; a friction shoe carried by said housing, said shoe being opposed to the inner side of said top post and having its outer end abutting said top follower; yielding means within said housing and bearing on said housing and shoe for pressing the shoe toward said top post, said bottom post being slidingly engaged between said shoe and said top post; an upstanding housing on said bottom follower, laterally spaced from the inner side of said bottom post; a friction shoe carried by said bottom housing, said shoe being opposed to the inner side of said bottom post and having its outer end abutting said bottom follower; yielding means within said bottom housing bearing on said housing and second named shoe for pressing said shoe toward said bottom post, said top post being slidingly engaged between said bottom shoe and bottom post; and a spring surrounding said posts and shoes and bearing at its top and bottom ends on said top and bottom followers.

3. In a friction shock absorber, the combination with a follower; of a second follower, said followers being relatively movable toward and away from each other; a post projecting from said first named follower toward said second named follower; a housing on said first named follower, laterally spaced from the inner side of the post; a friction shoe carried by said housing and engaged as its outer end by said first named follower, said shoe being opposed to the inner side of the post; yielding means within said housing bearing on said housing and shoe for pressing the shoe toward the post; a second post on said second named follower projecting toward said first named follower and slidingly engaged between said shoe and post of said first named follower; and a spring surrounding said posts and shoe and bearing at opposite ends on said followers, respectively.

4. In a friction shock absorber, the combination with top and bottom, relatively slidable friction posts having interengaging friction surfaces on their inner sides, each post having a follower at its outer end; of a friction shoe bearing on the outer side of one of said posts and having sliding engagement therewith, said shoe having its outer end abutting the follower of the other post; an abutment on said last named follower opposed to said shoe; yielding means interposed between and bearing on said shoe and abutment for pressing said shoe laterally inwardly toward said posts; and spring means bearing on said followers of said posts and yieldingly opposing movement of said posts toward each other.

5. In a friction shock absorber, the combination with a friction post having a follower at its outer end; of an abutment on said follower fixed with respect to the post and spaced laterally therefrom; a second friction post, said second named post having a follower at its outer end, said posts being movable lengthwise toward and away from each other; an abutment on said follower of the second named post fixed with respect to said second named post and spaced laterally therefrom; a friction shoe movable with each post and having its outer end abutting the follower of said post, each post having sliding engagement between the other post and the associated shoe, said posts having sliding engagement with each other on inclined surfaces; yielding means interposed between and bearing on each shoe and the abutment associated with the corresponding post for pressing said shoe against the other post; and spring means bearing on said followers of said posts yieldingly resisting relative approach of said posts.

6. In a friction shock absorber, the combination with a friction post; of an abutment fixed with respect to the post and spaced laterally therefrom; a second friction post, said posts being movable lengthwise toward and away from each other; an abutment fixed with respect to said second named post and spaced laterally therefrom; a friction shoe movable with each post, each post having sliding engagement between the other post and the associated shoe; a rubber pad under compression interposed between and bearing on each shoe and the abutment associated with the corresponding post for pressing said shoe against the other post; and spring means having shouldered engagement at opposite ends with said posts respectively for yieldingly resisting relative approach of said posts.

7. In a friction shock absorber, the combination with a friction post; of a follower at the outer end of said post; an abutment on said follower fixed with respect to the post and spaced laterally therefrom; a second friction post, said second named post having a follower at its outer end, said posts being movable lengthwise with respect to each other and having lengthwise sliding engagement with each other on their inner sides on surfaces inclined to the vertical; an abutment on said follower of the second named post, said abutment being fixed with respect to said second named post and spaced laterally therefrom; a friction shoe movable with each post engaged at its outer end by the follower of said post and having sliding engagement with the outer side of the other post; yielding means interposed between and bearing on each shoe and the corresponding abutment for pressing said shoe into engagement with the post with which it has sliding engagement; and spring means bearing at opposite ends on the followers of said posts respectively for resisting relative approach of said posts.

8. In a friction shock absorber, the combination with top and bottom followers; of a downwardly tapered top friction post depending from said top follower; an upwardly tapered bottom friction post upstanding from said bottom follower; a depending housing on said top follower laterally spaced from the inner side of said top post; a top friction shoe carried by said housing and having its upper end in abutment with said top follower, said shoe being opposed to the inner side of said top post; yielding means within said housing bearing on said housing and shoe for pressing said shoe laterally toward said top post, said bottom post being slidingly engaged between said top shoe and said top post; an upstanding housing on said bottom follower, laterally spaced from the inner side of said bottom post; a bottom friction shoe carried by said bottom housing and having its outer end in abutment with the bottom follower, said bottom shoe being opposed to the inner side of said bottom post; yielding means within said bottom housing bearing on said housing and bottom shoe for pressing said shoe toward said bottom post, said top post being slidingly engaged between said bottom shoe and bottom post; and a spring surrounding said posts and shoes and bearing at its top and bottom ends on said top and bottom followers.

9. In a friction shock absorber, the combination with a friction post; of a follower at the outer end of said post; an abutment on said follower fixed with respect to the post and spaced laterally from the inner side of said post; a friction shoe opposed to the inner side of said post and having its outer end abutting said follower; yielding means interposed between and bearing on said shoe and abutment for forcing the shoe toward said post; a second friction post having sliding engagement between said first named post and shoe, said posts having engagement with each other on inclined surfaces; a follower at the outer end of said second post; and spring means bearing at opposite ends on said followers of said first and second named posts for yieldingly opposing relative movement of said posts toward each other.

10. In a friction shock absorber, the combination with an outwardly tapered friction post; of a follower at the outer end of said post; an abutment on said follower fixed with respect to said post and spaced laterally from the inner side thereof; a second outwardly tapered friction post, said second post having a follower at its outer end, said posts being relatively movable lengthwise with respect to each other and having lengthwise sliding engagement with each other on their inner sides; a friction shoe in abutment at its outer end with the follower of said first named post and having sliding engagement with the outer side of said second named post; yielding means interposed between and bearing on said shoe and said abutment for pressing the shoe into engagement with said second named post; and spring means bearing at opposite ends on the followers of said first and second named posts for resisting relative approach of said posts.

11. In a friction shock absorber, the combination with a follower; of a second follower, said followers being relatively movable toward and away from each other; a post projecting from said first named follower toward said second named follower; a housing on said first named follower, laterally spaced from the inner side of the post; a friction shoe carried by said housing, said shoe being opposed to the inner side of the post; a rubber pad under compression within said housing pressing the shoe toward the post; a second post on said second named follower projecting toward said first named follower and slidingly engaged between said shoe and post of said first named follower; and a spring surrounding said posts and shoe and bearing at opposite ends on said followers, respectively.

12. In a friction shock absorber, the combination with a follower; of a friction post rigid with said follower; an abutment rigid with said follower and spaced laterally from said post; a second follower; a second friction post, said second named post being rigid with said second named follower, said posts being movable lengthwise with respect to each other and having lengthwise sliding engagement with each other on their inner sides; an abutment rigid with said second named follower and spaced laterally from said second named post; a friction shoe having its outer end abutting said first named follower; a second friction shoe having its outer end abutting said second named follower, said first and second named shoes having sliding engagement with the outer sides of said second and first named posts, respectively; yielding means interposed between and bearing on each shoe and the corresponding abutment for pressing said shoe into engagement with the post with which it has sliding engagement; and spring means engaged with said followers respectively for resisting relative approach of said posts.

13. In a friction shock absorber, the combination with top and bottom, relatively slidable friction posts having interengaged friction surfaces on their inner sides, each post having a follower at its outer end; of a friction shoe associated with the follower of each post and having its outer end bearing on the follower of said post to be moved with said post toward the other post and slidably engaging the latter on its outer side; an abutment on each follower opposed to the friction shoe which bears on said follower; yielding means under lateral compression interposed between and bearing on said abutments and shoes for pressing said shoes laterally inwardly toward said posts; and spring means bearing at opposite ends on the followers of said posts for yieldingly opposing movement of said posts toward each other.

14. In a friction shock absorber, the combination with a friction post having a follower at its outer end; of an abutment on said follower fixed with respect to the post and spaced laterally from the inner side of said post; a friction shoe engaged at its outer end by said follower, said shoe being opposed to the inner side of said post; yielding means interposed between and bearing on said shoe and abutment for forcing said shoe toward said post; a second friction post having sliding engagement between said first named post and shoe, said second named post having a follower at its outer end; and spring means interposed between and bearing at opposite ends on the followers of said posts for yieldingly opposing relative movement of said posts toward each other.

15. In a friction shock absorber, the combination with a friction post having a follower at its outer end; of an abutment on said follower fixed with respect to said post and spaced laterally from the inner side thereof; a second friction post, said second post having a follower at its outer end, said posts being relatively movable lengthwise with respect to each other and having lengthwise sliding engagement with each other on their inner sides; a friction shoe having sliding engagement with the outer side of said second named post, said shoe bearing at its outer end on the follower of the first named post; yielding means interposed between and bearing on said shoe and said abutment for pressing the shoe into engagement with said second named post; and spring means engaging said followers respectively for resisting relative approach of said posts.

GEORGE E. DATH.

REFERENCES CITED

The following references are of record in the file of this patent:

UNITED STATES PATENTS

| Number | Name | Date |
|---|---|---|
| 1,640,421 | O'Connor | Aug. 30, 1927 |
| 1,884,520 | Barrows | Oct. 25, 1932 |
| 1,924,814 | Sproul | Aug. 29, 1933 |
| 2,289,790 | Light | July 14, 1942 |
| 2,388,230 | Light | Oct. 30, 1945 |
| 2,416,691 | Haseltine | Mar. 3, 1947 |
| 2,444,337 | Cottrell | June 29, 1948 |
| 2,534,418 | Dath | Dec. 19, 1950 |
| 2,535,193 | Dath | Dec. 26, 1950 |